(12) United States Patent
Oh

(10) Patent No.: US 6,293,118 B1
(45) Date of Patent: Sep. 25, 2001

(54) TEMPERATURE SENSOR FIXING APPARATUS OF AIR CONDITIONER

(75) Inventor: Jong-Rog Oh, Suwon (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/545,832

(22) Filed: Apr. 10, 2000

(30) Foreign Application Priority Data

Jul. 28, 1999 (KR) .................................................. 99-30806

(51) Int. Cl.⁷ ...................................................... F25B 49/00
(52) U.S. Cl. ............................................................... 62/229
(58) Field of Search ............................. 62/229, 228, 407; 312/101; 55/493, 321

(56) References Cited

U.S. PATENT DOCUMENTS

| | | | |
|---|---|---|---|
| 4,334,899 | * 6/1982 | McConnell | 55/321 |
| 4,342,133 | * 8/1982 | Minton | 15/339 |
| 4,359,876 | * 11/1982 | McCarty | 62/180 |
| 4,743,281 | * 5/1988 | Kennedy et al. | 55/493 |
| 4,976,753 | * 12/1990 | Huang | 96/58 |
| 5,297,395 | * 3/1994 | Ozu et al. | 62/174 |
| 5,396,778 | * 3/1995 | Bolton et al. | 62/156 |
| 5,454,231 | * 10/1995 | Bolton et al. | 62/262 |
| 5,622,058 | * 4/1997 | Ramakrishnan et al. | 62/295 |
| 5,921,094 | * 7/1999 | Bang et al. | 62/126 |
| 5,987,911 | * 11/1999 | Arai et al. | 62/407 |

\* cited by examiner

*Primary Examiner*—Teresa Walberg
*Assistant Examiner*—Daniel Robinson
(74) *Attorney, Agent, or Firm*—Robert E. Bushnell, Esq.

(57) ABSTRACT

A temperature sensor fixing apparatus of an air conditioner constructed with a temperature sensor being inserted between a vaporizing unit and a front panel for detecting the temperature of room air infused through a suction inlet of the front panel, the apparatus including a sensor holder integrally protruded at one side of the suction inlet of the front panel for fixing a temperature sensor apart at a predetermined distance from the vaporizing unit and being positioned in the middle of the vaporizing unit, thereby eliminating additional molding cost for manufacturing a separate sensor holder, preventing any contact from being made between sensor holder and vaporizing unit to avoid any deformation of the vaporizing unit for a defective product and preventing the temperature sensor from functioning its false operations by getting in contact with the vaporizing unit.

20 Claims, 6 Drawing Sheets

TEMPERATURE SENSOR FIXING APPARATUS OF AIR CONDITIONER

CLAIM OF PRIORITY

This application makes reference to, incorporates the same herein, and claims all benefits accruing under 35 U.S.C. §119 from an application for A Fixing Apparatus of Temperature Sensor for Air Conditioner earlier filed in the Korean Industrial Property Office on Jul. 28, 1999 and there duly assigned Serial No. 30806/1999.

BACKGROUND OF THE INVENTION

1. Field of the Invention

The present invention relates to a window type air conditioner, and more particularly to a temperature sensor fixing apparatus of an air conditioner for conveniently detecting temperature of room air infused through a suction grill member of a front panel by improving fixation of a temperature sensor.

2. Brief Description of the Prior Art

In general, a conventional window type air conditioner includes a vaporizing unit installed at the front portion of a base panel for heat-exchanging the infused room air to cool the air, a blade frame mounted at one lateral upper end of the vaporizing unit for partitioning and discharging the cool air heat-exchanged by passing through the vaporizing unit and a control box assembled at the lower portion of the blade frame for controlling operations of the product and accommodating electronic parts.

The vaporizing unit and blade frame are coupled with an internal case secured at the top surface thereof. The control box is coupled with a lateral surface of the vaporizing unit and a lower surface of the blade frame. A plurality of vertical blades are installed inside the blade frame for horizontally controlling air flow which has been heat-exchanged and discharged through all area of the blade frame.

On the other hand, an external panel is mounted on the base panel for forming an external appearance of the product by covering all of its sides except its front side, wherein a plurality of infusing holes are formed on both sides of the external panel for getting the outside air to be infused into the product. A front panel covers the front portion of the external panel for fanning its front appearance of the product with inflow and outflow of room air.

The front panel includes a suction inlet at an area corresponding to the vaporizing unit for allowing a suction grill member to be attached or detached and a discharging outlet at an area corresponding to the blade frame for discharging the heat-exchanged air out of the product and a through hole at an area corresponding to the control box.

Furthermore, the suction grill member is inserted at the suction inlet, allowing attachment and detachment thereof. On the other hand, a plurality of horizontal blades are vertically installed in a predetermined interval for controlling vertical flow of the room air discharging out through all area of the discharging outlet, allowing their vertical movements.

In addition, a compressor is installed at one middle portion of the base panel for compressing circulating coolant to the coolant of high temperature and high pressure to be supplied into the vaporizing unit. An external case is installed at rear portion of the base panel for supporting a condenser (not shown). A plurality of brackets are coupled at the upper inner surface of the external panel for keeping constant a predetermined horizontal interval set between external case and internal case.

A temperature sensor is fixed at the front side of the vaporizing unit with a separate sensor holder. The vaporizing unit includes two supporting plates vertically oriented at a predetermined interval, a plurality of plate fins horizontally stacked in parallel at a predetermined interval between the supporting plates, a plurality of coolant tubes penetrated through the sides of two supporting plates and plate fins and arranged at a predetermined interval and a plurality of return pipes protruded out of the supporting plates for respectively connecting a pair of ends of the coolant tubes to form a coolant pass line.

The sensor holder includes an inserting piece inserted between plate fins of the vaporizing unit, a inserting groove formed at the inserting piece for being coupled by being forcibly fit to an external periphery of the coolant tube, a protection plate integrally and perpendicularly curved with the inserting side for keeping the temperature sensor from getting into contact with the vaporizing unit and a fixing protruder, which is L-shaped, at one front side of the protection plate with its top being kept open for getting only the electric wire to be forcibly inserted.

In consequence, there is a problem in the temperature sensor fixing apparatus of the air conditioner thus constructed in the prior art in that the sensor holder detachably fixed at one front side of the vaporizing unit has been used for fixing the temperature sensor by connecting between control box and wire, thereby resulting in high cost for molding the sensor holder as an additional part.

In addition, in case of the sensor holder, the inserting piece protruded to the rear thereof is inserted between those plate fins of vaporizing unit, and then the inserting groove fanned at the inserting piece is forcibly fitted at the external periphery of the coolant tube for fixation. Therefore, when the sensor holder is fixed at the vaporizing unit with slight pressing force, the plate fins of thin aluminum plate is easily deformed to cause a defective product. When the inserting groove is fitted to the coolant tube, plate fins disturb convenient matching of the two parts, causing a trouble in correctly recognizing the position for insertion of parts and significantly decreasing job efficiency and productivity.

Furthermore, the protection plate positioned at the front portion of the sensor holder is constructed to be tightly attached to the vaporizing unit. If the electric wire connected with the temperature sensor at the fixing protruder of the protection plate is loosely fixed, the temperature sensor may not remain within the front area of the protection plate, diverting out and easily getting in contact with the surface of the vaporizing unit causing false operations.

Examples from the conventional art of air conditioners having temperature sensors are seen in the following U.S. Patents. U.S. Pat. No. 5,987,911, to Arai, entitled Air Conditioner, describes an air conditioner having a suction grill and a front panel including an inlet port for sucking air from the suction grill inside, with a concave air passage for room temperature detection fanned in the front face of the front panel and an air suction port for sucking air formed at an opposite part to the air passage. A temperature sensor is mounted in the concave air passage.

U.S. Pat. Nos. 5,732,565 and 5,622,058, both to Ramakrishnan et al., and both entitled Modular Room Air Conditioner, describe an air conditioning unit having an indoor temperature control thermistor mounted to a panel next to the evaporator.

U.S. Pat. No. 5,396,778, to Bolton et al., entitled Thermostat Capillary Installation On A Room Air Conditioner, describes an air conditioner having a thermostat capillary mounted in close proximity to the inside face of the indoor heat exchanger of a room air conditioner. The indoor heat exchanger includes a flat surface adapted to receive a flow of air, and having a pair of tube sheets at opposite ends. The tube sheet adjacent to the capillary has a recess formed to receive the capillary.

Based on my reading of the art, then, I have decided that what is needed is an improved fixing apparatus for a temperature sensor of an air conditioner which does not suffer from the above described problems.

SUMMARY OF THE INVENTION

It is therefore an object of the present invention to provide an improved air conditioner.

It is a further object of the present invention to provide an improved temperature sensor fixing apparatus of an air conditioner.

It is a yet further object of the invention to provide a temperature sensor fixing apparatus which is less expensive to manufacture.

A still further object of the invention is to provide a temperature sensor fixing apparatus which is easier to assemble.

Another object of the invention is to provide a temperature sensor fixing apparatus which firmly fixes the temperature sensor.

Yet another object of the invention is to provide a temperature sensor which more accurately registers the room air temperature.

Still another object of the invention is to provide a temperature sensor which avoids damage to the vaporizing unit.

The present invention is presented to achieve the above objects, by providing a temperature sensor fixing apparatus of an air conditioner in which a temperature sensor is fixed in a sensor holder integrally protruding at one side of a suction inlet of the front panel to eliminate additional cost for manufacturing the sensor holder, thereby preventing the sensor holder from contacting a vaporizing unit so as not to yield a defective product due to deformation of the vaporizing unit, preventing the temperature sensor from functioning false operations, and simplifying the procedure for fixing the temperature sensor to improve job efficiency and productivity.

In order to accomplish the aforementioned objects of the present invention, there is provided a temperature sensor fixing apparatus of an air conditioner constructed with a temperature sensor inserted between a vaporizing unit and a front panel for detecting temperature of room air infused through suction inlet of the front panel, the apparatus comprising a sensor holder integrally protruded at one side of the suction inlet of the front panel for fixing a temperature sensor apart at a predetermined distance from the vaporizing unit and being positioned in the middle of the vaporizing unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Turning now to the drawings, the conventional window type air conditioner described above, as shown in FIG. 1, includes a vaporizing unit 20 installed at the front portion of a base panel 10 for heat-exchanging the infused room air to cool the air, a blade frame 30 mounted at one lateral upper end of the vaporizing unit 20 for partitioning and discharging the cool air heat-exchanged by passing through the vaporizing unit 20 and a control box 40 assembled at the lower portion of the blade frame 30 for controlling operations of the product and accommodating electronic parts.

Figure 1:
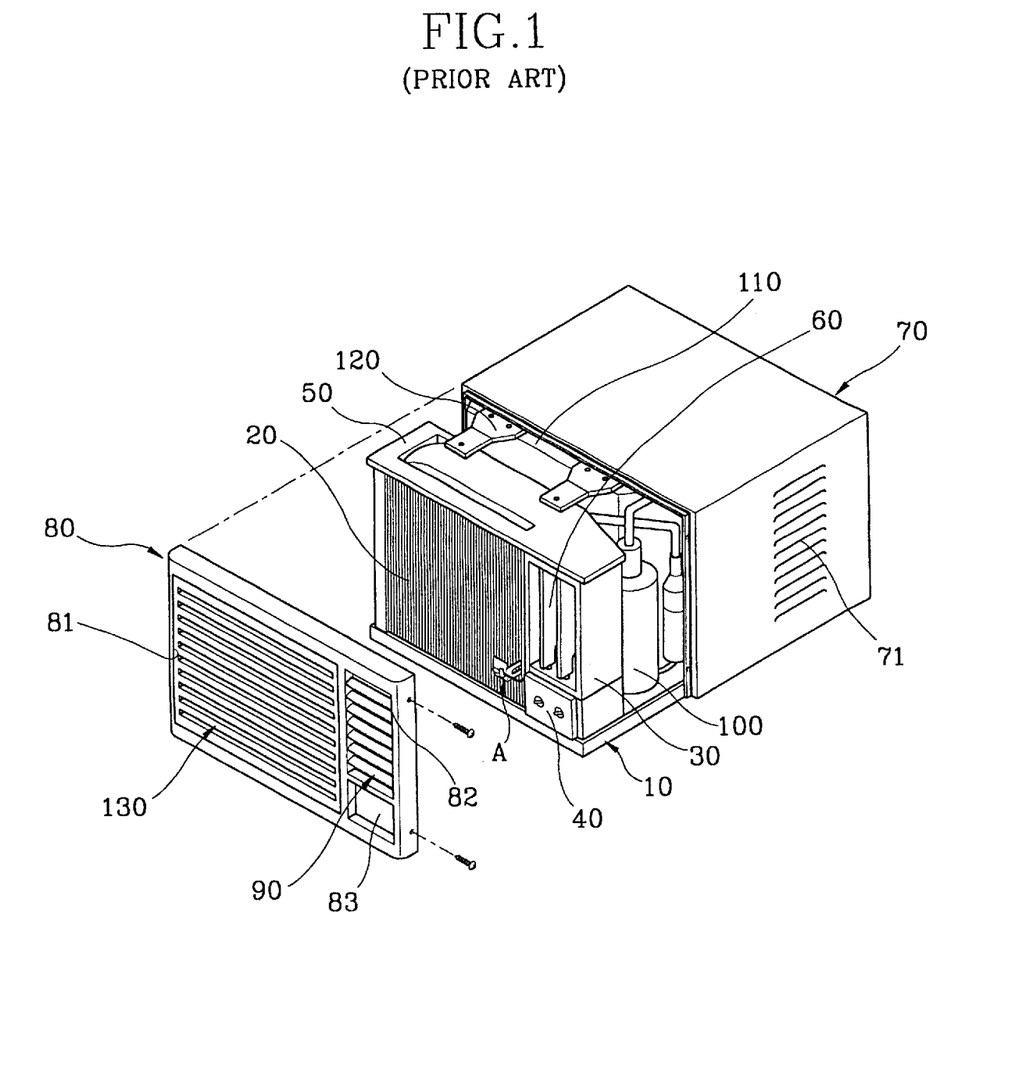
FIG. 1 is a partial analytical perspective view for illustrating a temperature sensor mounted at a conventional air conditioner.

The vaporizing unit 20 and blade frame 30 are coupled with an internal case 50 secured at the top surface thereof. The control box 40 is coupled with a lateral surface of the vaporizing unit 20 and a lower surface of the blade frame 30. A plurality of vertical blades 60 are installed inside the blade frame 30 for horizontally controlling air flow which has been heat-exchanged and discharged through all area of the blade frame 30.

On the other hand, an external panel 70 is mounted on the base panel 10 for forming an external appearance of the product by covering all of its sides except its front side, wherein a plurality of infusing holes 71 are formed on both sides of the external panel 70 for getting the outside air to be infused into the product. A front panel 80 covers the front portion of the external panel 70 for forming its front appearance of the product with inflow and outflow of room air.

The front panel 80 includes a suction inlet 81 at an area corresponding to the vaporizing unit 20 for allowing a suction grill member to be attached or detached and a discharging outlet 82 at an area corresponding to the blade frame 30 for discharging the heat-exchanged air out of the product and a through hole 83 at an area corresponding to the control box 40.

Furthermore, the suction grill member 130 is inserted at the suction inlet 81, allowing attachment and detachment thereof. On the other hand, a plurality of horizontal blades 90 are vertically installed in a predetermined interval for controlling vertical flow of the room air discharging out through all area of the discharging outlet 82, allowing their vertical movements.

In addition, a compressor 100 is installed at one middle portion of the base panel 10 for compressing circulating coolant to the coolant of high temperature and high pressure to be supplied into the vaporizing unit 20. An external case 110 is installed at rear portion of the base panel 110 for supporting a condenser (not shown). A plurality of brackets 120 are coupled at the upper inner surface of the external panel 70 for keeping constant a predetermined horizontal interval set between external case 110 and internal case 50.

Figure 2:
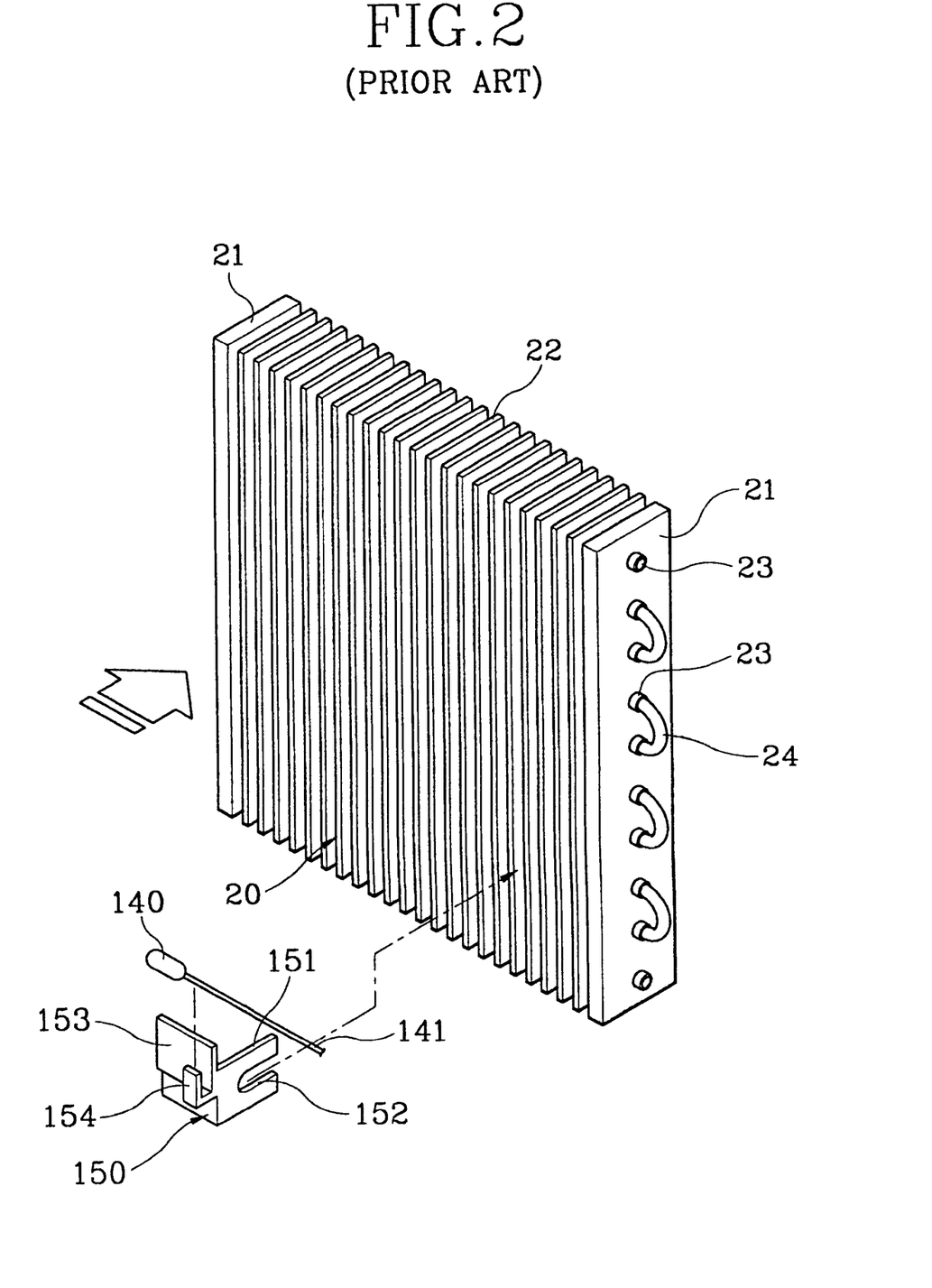
FIG. 2 is an enlarged analytical perspective view for illustrating part A shown in FIG. 1.
Figure 3:
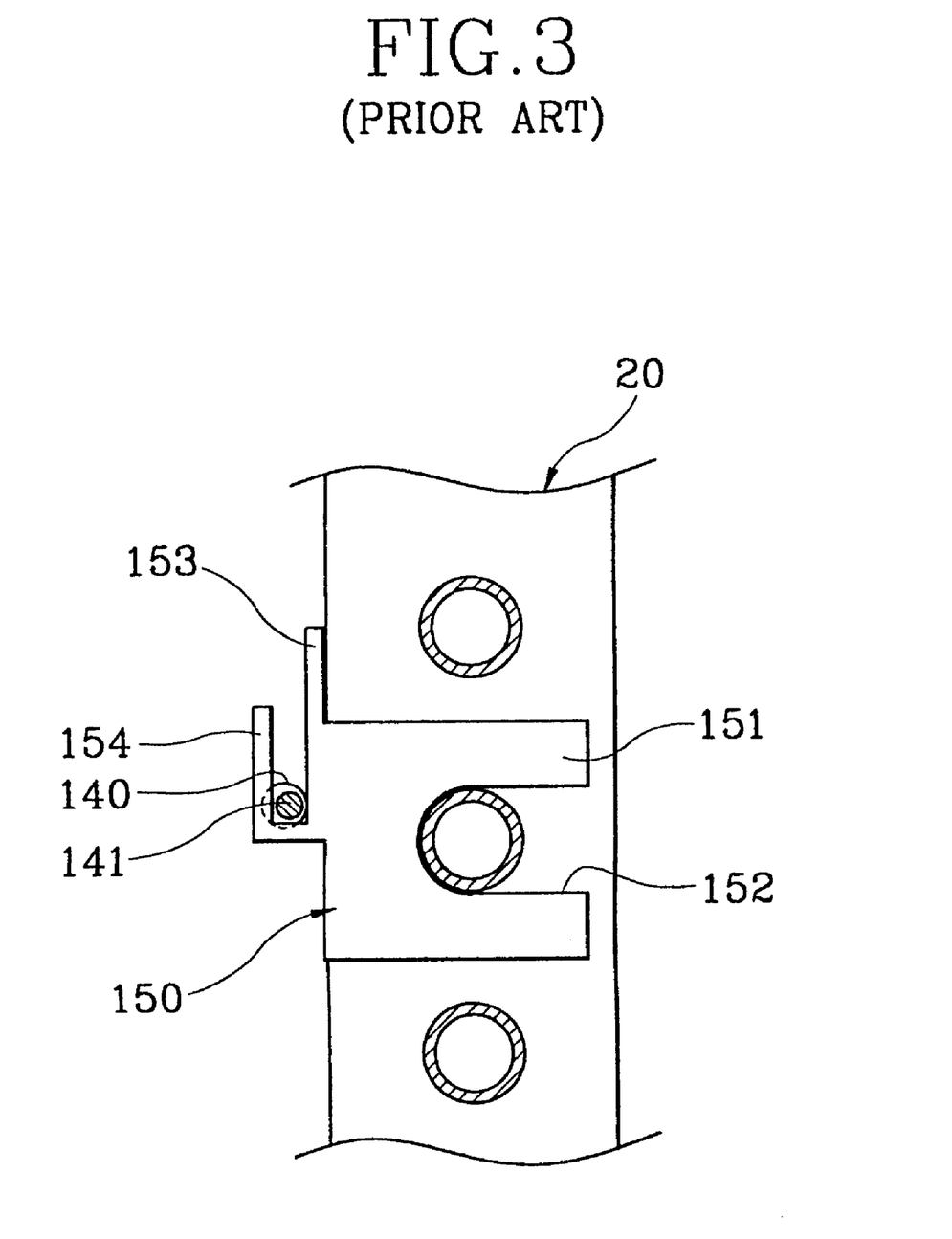
FIG. 3 is an assembly cross-sectional view for illustrating fixation of a temperature sensor in accordance with the prior art.

As shown in FIGS. 2 and 3, a temperature sensor 140 is fixed at the front side of the vaporizing unit 20 with a separate sensor holder 150. The vaporizing unit 20 includes two supporting plates 21 vertically oriented at a predetermined interval, a plurality of plate fins 22 horizontally stacked in parallel at a predetermined interval between the supporting plates 21, a plurality of coolant tubes 23 penetrated through the sides of two supporting plates 21 and plate fins 22 and arranged at a predetermined interval and a plurality of return pipes 24 protruded out of the supporting plates 21 for respectively connecting a pair of ends of the coolant tubes 23 to form a coolant pass line.

The sensor holder 150 includes an inserting piece 151 inserted between plate fins 22 of the vaporizing unit 20, a inserting groove 152 formed at the inserting piece 151 for being coupled by being forcibly fit to an external periphery of the coolant tube 23, a protection plate 153 integrally and perpendicularly curved with the inserting side 151 for keeping the temperature sensor 140 from getting into contact with the vaporizing unit 20 and a fixing protruder 154, which is L-shaped, at one front side of the protection plate 153 with its top being kept open for getting only the electric wire 141 to be forcibly inserted.

In consequence, there is a problem in the temperature sensor fixing apparatus of the air conditioner thus constructed in the prior art in that the sensor holder 150 detachably fixed at one front side of the vaporizing unit 20 has been used for fixing the temperature sensor 140 by connecting between control box 40 and wire 141, thereby resulting in high cost for molding the sensor holder 150 as an additional part.

In addition, in case of the sensor holder 150, the inserting piece 151 protruded to the rear thereof is inserted between those plate fins 22 of vaporizing unit 20, and then the inserting groove 152 formed at the inserting piece 151 is forcibly fitted at the external periphery of the coolant tube 23 for fixation. Therefore, when the sensor holder 150 is fixed at the vaporizing unit 20 with slight pressing force, the plate fins 22 of thin aluminum plate is easily deformed to cause a defective product. When the inserting groove 152 is fitted to the coolant tube 23, plate fins 22 disturb convenient matching of the two parts, causing a trouble in correctly recognizing the position for insertion of parts and significantly decreasing job efficiency and productivity.

Furthermore, the protection plate 153 positioned at the front portion of the sensor holder 150 is constructed to be tightly attached to the vaporizing unit 20. If the electric wire 141 connected with the temperature sensor 140 at the fixing protruder 154 of the protection plate 153 is loosely fixed, the temperature sensor 140 may not remain within the front area of the protection plate 153, diverting out and easily getting in contact with the surface of the vaporizing unit 20 causing false operations.

Figure 4:
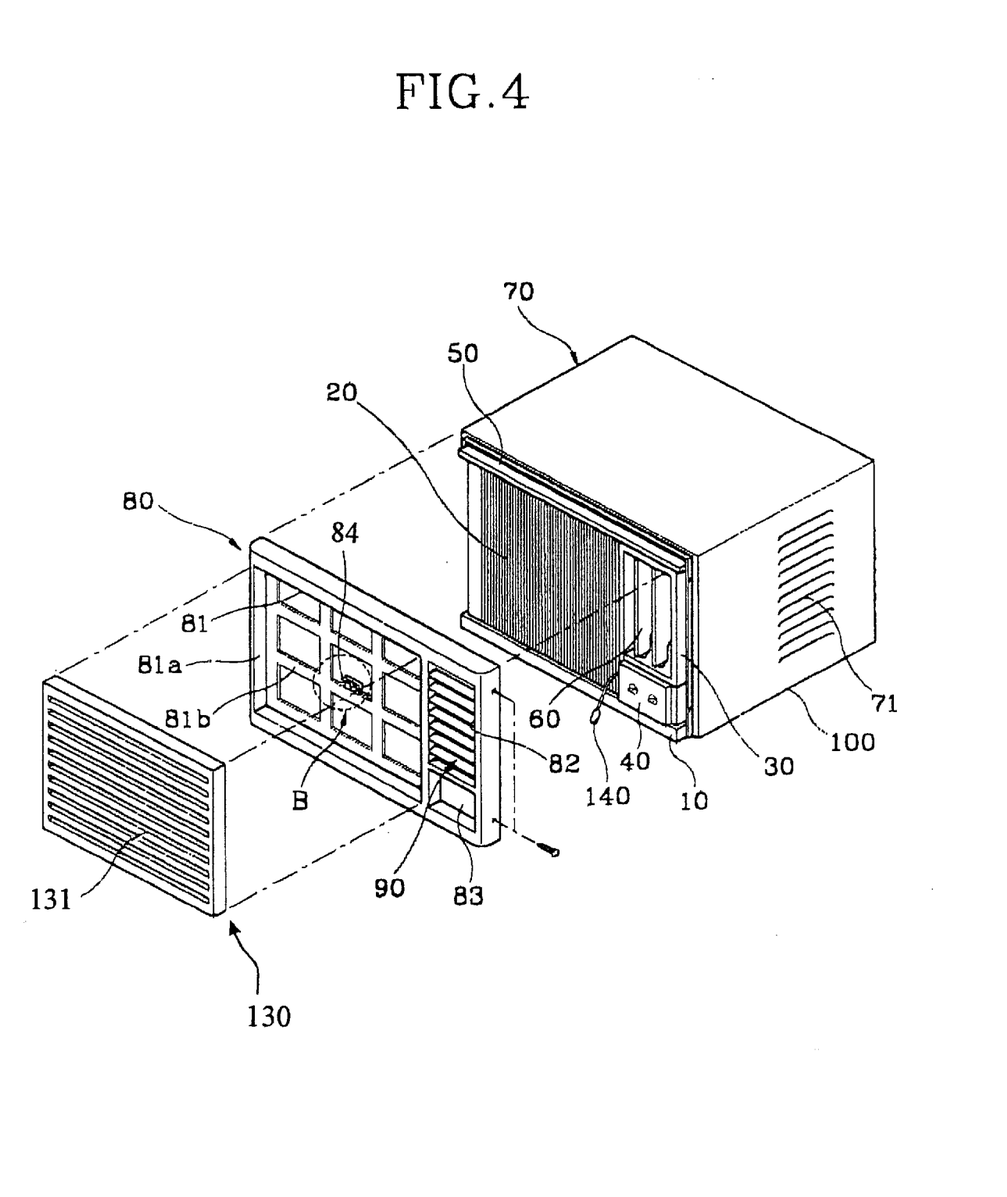
FIG. 4 is a partial analytical perspective view for illustrating a temperature sensor fixing apparatus of an air conditioner in accordance with the present invention.

An embodiment of the present invention will now be described in detail with reference to FIGS. 4 through 6. It should be noted that the same or similar reference numerals of the prior art are used for the same or similar parts in the drawings of the present invention for convenient description and understandings. A temperature sensor fixing apparatus of the present invention is a sensor holder 84 integrally coupled with an end of suction inlet 81 of a front panel 80 for fixing a temperature sensor at the suction inlet 81 apart at a predetermined distance from the vaporizing unit 20. In other words, the suction inlet 81 includes a recess 81a of a predetermined depth for insertion of the detachable suction grill member 130 and a latticed plate 81b integrally formed in the recess 81a, and rearward of the front surface of the front panel, for preventing the suction grill member 130 from being in contact with the vaporizing unit 20. The sensor holder 84 is integrally mounted for fixing the temperature sensor 140 at a predetermined rear portion of the latticed plate 81b.

The sensor holder 84 includes a front surface supporter 85 vertically protruded on the latticed plate 81b and a rear surface supporter 86 protruded apart from the front surface supporter 85 at a predetermined distance behind the horizontal portion of the latticed plate 81b with the top of sensor holder open for horizontally pressing down and forcibly fixing the electric wire 141 between the front and rear supporters 85, 86. In this case, the horizontal length of the front supporter 85 is smaller than that of the rear surface supporter 86. The gap between the front and rear supporters 85, 86 is small enough for tight insertion of the wire 141. The height of the front surface supporter 85 is smaller or the same as that of the rear surface supporter 86.

In the rear supporter 86, a hole 86c is formed between horizontal and vertical parts 86a, 86b for allowing air to flow through hole 88c. Furthermore, the sensor holder 84 is formed to face the suction hole 131 of the suction grill member 130 to be inserted into the recess 81a of the suction inlet 81. That is, sensor holder 84 aligns with one of the horizontal suction holes of suction grill member 130 when suction grill member 130 is inserted into recess 81a.

Next, operations and effects of the present invention thus constructed will be described below. In order to support the temperature sensor 140 with the sensor holder 84, as shown in FIG. 4, at first, the separate front panel 80 is coupled with the front edge of the external panel 70. Both sides of the front panel 80 and both front end sides of the external panel 70 are fastened together with a plurality of screws for complete assembly.

Then, the temperature sensor 140 connected to the control box by the wire 141 is fixed at the sensor holder 84 integrally installed at the rear surface of the suction inlet 81 of the front panel 80. The separate suction grill member 130 is inserted from the front direction of the front panel 80 into the recess 81a of the suction inlet 81, thereby completing the assembly of front panel 80 and suction grill member 130.

Figure 5:
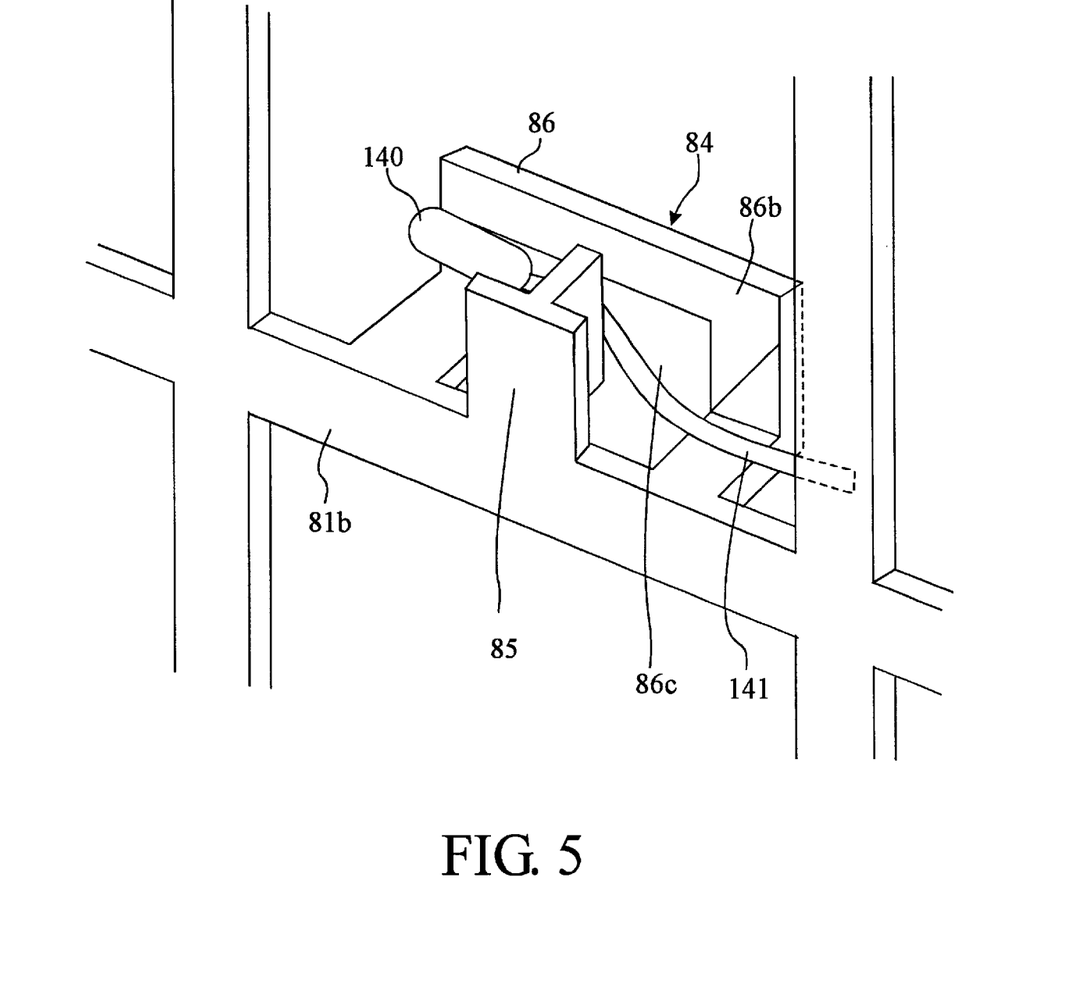
FIG. 5 is an enlarged perspective view for illustrating part B shown in FIG. 4, including the temperature sensor mounted in the sensor holder.
Figure 6:
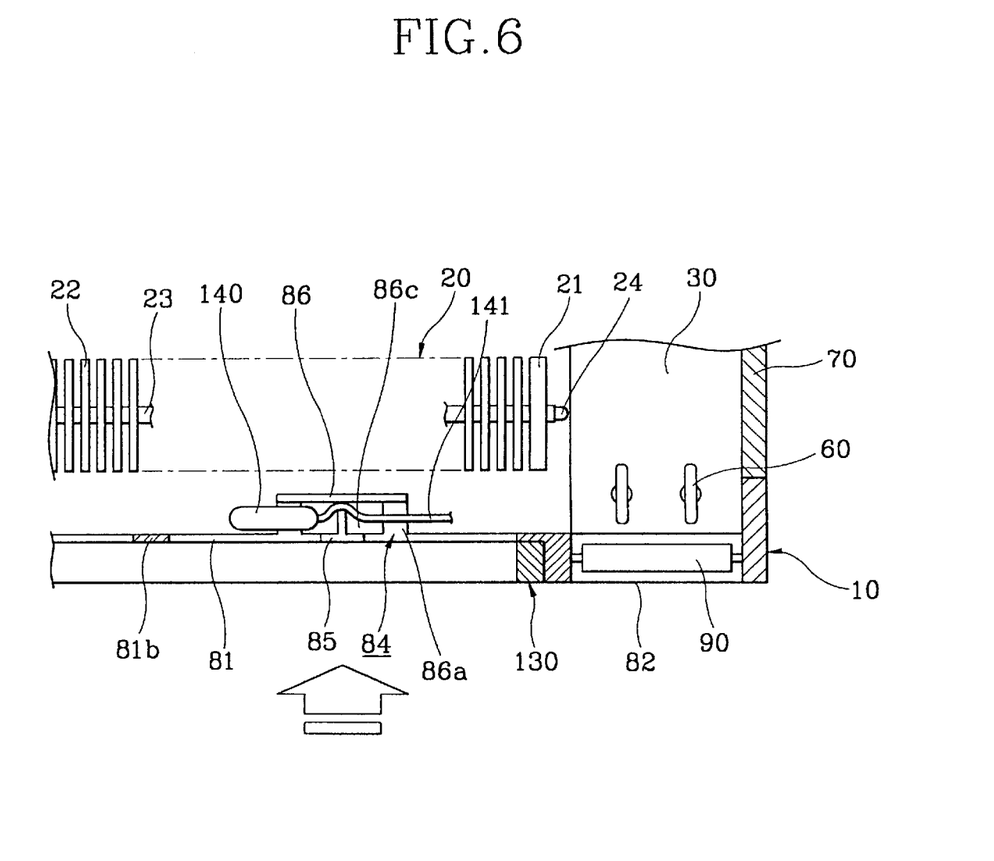
FIG. 6 is a plane cross-sectional view for illustrating fixation of a temperature sensor in accordance with the present invention.

As shown in FIG. 5, the temperature sensor 140 is indirectly secured at one side of the sensor holder 84 by the wire 141 which is directly fixed by insertion at the gap between the front and rear supporters 85, 86 of the sensor holder 84. In other words, the temperature sensor 140 can be positioned depending on where the wire 141 is fixed by being inserted at the gap between the front and rear supporters 85, 86. As a result, the wire 141 is horizontally pulled or pushed, and the temperature sensor 140 is simultaneously moved by the force applied to the wire 141 and thus may be placed at any predetermined position of the sensor holder 84 and not diverted out of the sensor holder 84.

As the sensor holder 84 is integrally injection-molded at the suction inlet 81 of the front panel 80, there is no need for a separate manufacturing process of the sensor holder 84, thereby reducing additional cost of molding. In addition, as the front panel 80 and the external panel 70 are coupled together with the sensor holder 84 being installed at the suction inlet 81 of the front panel 80, the sensor holder 84 will be positioned apart at a predetermined distance from the vaporizing unit 20 without causing any contact to thereby prevent the vaporizing unit 20 from deforming to be a defective product. When the temperature sensor 140 is fixed at the sensor holder 84, there will be no disturbance from the vaporizing unit to thereby improve job efficiency and productivity.

Furthermore, as the sensor holder 84 is fixed apart at a predetermined distance from the vaporizing unit 20, there is no longer influence on the temperature generated by the vaporizing unit 20, thereby preventing any false operation of the temperature sensor and more conveniently detect the temperature of room air. In particular, the temperature sensor 140 is mounted closer to the center of the vaporizing unit 20 than the edge thereof, thereby significantly improving functions of the temperature sensor.

However, if the temperature sensor 140 is installed closer to the upper portion of the vaporizing unit 20, the temperature sensor 140 functions less precisely because less room air flows toward the edge of the vaporizing unit 20 than toward the center of the vaporizing unit 20. In other words, if the temperature sensor 140 detects the temperature of room air less precisely, it may continuously function during cooling operations of the air conditioner even if room air gets to a desired temperature thereof. If this is the case, the temperature sensor 140 continuously repeats on/off its operations due to the heat generated by the vaporizing unit 20 during heating operations of the air conditioner.

The aforementioned problems can be explained with a result of experiments in which air velocity distributions are determined at respective parts of the area of the vaporizing unit 20, as shown in Table 1, by rotating an air blowing fan (not shown) installed in the middle of the air conditioner and apart at a predetermined distance from the rear portion of the vaporizing unit 20.

TABLE 1

Air velocity measurements at locations left-to-right and top-to-bottom on the vaporizing unit of an air conditioner of the present invention

| 1.8 | 2.6 | 2.4 | 2.1 | 1.4 |
| 1.5 | 2.5 | 3.1 | 2.2 | 1.3 |
| 1.4 | 2.6 | 3.3 | 2.7 | 1.4 |
| 1.3 | 2.2 | 2.7 | 2.1 | 1.2 |
| 1.5 | 2.0 | 2.2 | 2.0 | 1.4 |

The result shown in Table 1 is measured with a POCKET AIR VELOCITY/WIND METER manufactured by Nielson Kellerman Co. USA. As shown in Table 1, the average air velocity is 2.036 m/sec. The air velocity of 2.1 to 3.3 m/sec at the center of the area of the vaporizing unit 20 is measured to be higher than that at the edges, 1.4 to 2.6 m/sec. In consequence, it can be seen that the observed range of air velocities is greater at the center of the area of the vaporizing unit than at the edges by 0.7 m/sec.

As described above, there can be advantages in the temperature sensor fixing apparatus of the present invention in that the temperature sensor is fixed by the sensor holder integrally injection-molded at the suction inlet of the front panel to be kept apart at a predetermined distance from the vaporizing unit, thereby eliminating the molding cost for manufacturing a separate sensor holder, preventing any contact from being made between the sensor holder and vaporizing unit not to cause any deformation of the vaporizing unit for a defective product and preventing the temperature sensor from functioning its false operations by getting in contact with the vaporizing unit.

What is claimed is:

1. An air conditioner, comprising:
    a vaporizing unit mounted in a front portion of the air conditioner;
    a temperature sensor attached to a wire extending from a side of the vaporizing unit;
    a front panel mounted in the air conditioner in front of the vaporizing unit, said front panel having a front surface and having a suction inlet formed in the panel, said suction inlet comprising:
        a recess formed in the suction inlet to a depth rearward of the front surface of the front panel;
        a latticed plate formed in the recess rearward of said front surface; and
        a sensor holder for holding said temperature sensor, said sensor holder formed on a portion of said latticed plate and protruding vertically and rearward from said portion of the latticed plate.

2. The air conditioner of claim 1, said sensor holder being formed at a position on said latticed plate corresponding to a position on said vaporizing unit closer to the center than to the edge of the vaporizing unit.

3. The air conditioner of claim 1, said latticed plate defining a 3-by-3 array of rectangular holes in said recess.

4. The air conditioner of claim 3, said sensor holder being formed protruding into the central one of said rectangular holes.

5. The air conditioner of claim 1, further comprising:
    a suction grill member having horizontal suction holes, said suction grill member being insertable into said recess.

6. The air conditioner of claim 5, said sensor holder being vertically positioned in alignment with one of the horizontal suction holes of said suction grill when said suction grill is inserted into said recess.

7. The air conditioner of claim 1, said sensor holder being positioned with a gap between the sensor holder and said vaporizing unit.

8. The air conditioner of claim 1, said sensor holder further comprising:
    a front surface supporter protruding vertically from said portion of said latticed plate; and
    a rear surface supporter for fixing said wire against said front surface supporter, said rear surface supporter comprising:
        a horizontal part protruding rearward from said portion of said latticed plate; and
        a vertical part extending vertically from a rear portion of said horizontal part.

9. The air conditioner of claim 8, said sensor holder further comprising:
    said horizontal and vertical parts having a hole for allowing air to flow.

10. The air conditioner of claim 8, said front supporter being T-shaped in cross-section with the base of the "T" projecting rearward, for fixing the wire against the rear supporter.

11. The air conditioner of claim 8, the gap between said front supporter and rear supporter being small enough for tight insertion of the wire.

12. The air conditioner of claim 11, said gap being of a size to allow the inserted wire to be pushed or pulled horizontally for adjustment of the position of the temperature sensor.

13. The air conditioner of claim 8, the height of said front surface supporter being less than or equal to the height of said rear supporter.

14. The air conditioner of claim 8, the horizontal length of said front supporter being less than the horizontal length of said rear supporter.

15. An air conditioner, comprising:
    a vaporizing unit mounted in a front portion of the air conditioner;
    a temperature sensor attached to a wire extending from a side of the vaporizing unit;

a front panel mounted in the air conditioner in front of the vaporizing unit, said front panel having a front surface and having a suction inlet formed in the panel, said suction inlet comprising:
- a recess fanned in the suction inlet to a depth rearward of the front surface of the front panel;
- a latticed plate fonncd in the recess rearward of said front surface; and
- a sensor holder for holding said temperature sensor, said sensor holder formed on a portion of said latticed plate and protruding vertically and rearward from said portion of the latticed plate; said sensor holder being integrally fanned in the latticed plate.

16. The air conditioner of claim 10, said sensor holder being integrally formed in the latticed plate.

17. The air conditioner of claim 4, said sensor holder further comprising:
- a front surface supporter protruding vertically from said portion of said latticed plate; and
- a a rear surface supporter for fixing said wire against said front surface supporter, said rear surface supporter comprising:
  - a horizontal part protruding rearward from said portion of said latticed plate; and
  - a vertical part extending vertically from a rear portion of said horizontal part.

18. The air conditioner of claim 6, said sensor holder further comprising:
- a front surface supporter protruding vertically from said portion of said latticed plate; and
- a rear surface supporter for fixing said wire against said front surface supporter, said rear surface supporter comprising:
  - a horizontal part protruding rearward from said portion of said latticed plate; and
  - a vertical part extending vertically from a rear portion of said horizontal part.

19. An air conditioner comprising:
- a vaporizing unit mounted in a front portion of the air conditioner;
- a temperature sensor attached to a wire extending from a side of the vaporizing unit;
- a front panel mounted in the air conditioner in front of the vaporizing unit, said front panel having a front surface and having a suction inlet fanned in the panel, said suction inlet comprising:
  - a recess fanned in the suction inlet to a depth rearward of the front surface of the front panel;
  - a latticed plate formed in the recess rearward of said front surface; and
  - a sensor holder for holding said temperature sensor, said sensor holder fanned on a portion of said latticed plate and protruding vertically and rearward from said portion of the latticed plate, said sensor holder further comprising:
    - a front surface supporter protruding vertically from said portion of said latticed plate; and
    - a rear surface supporter for fixing said wire against said front surface supporter, said rear surface supporter comprising:
      - a horizontal part protruding rearward from said portion of said latticed plate; and
      - a vertical part extending vertically from a rear portion of said horizontal part.

20. An air conditioner, comprising:
- a vaporizing unit mounted in a front portion of the air conditioner;
- a temperature sensor attached to a wire extending from a side of the vaporizing unit;
- a front panel mounted in the air conditioner in front of the vaporizing unit, said front panel having a front surface and having a suction inlet fanned in the panel, said suction inlet comprising:
  - a recess fanned in the suction inlet to a depth rearward of the front surface of the front panel;
  - a latticed plate fanned in the recess rearward of said front surface and spaced-apart from said vaporizing unit, said latticed plate providing an intermediate surface being perforated by a plurality of openings extending between said front surface and said vaporizing unit; and
  - a sensor holder monolithically formed with said latticed plate as an integral component element of said latticed plate, positioning said temperature sensor rearward from said latticed plate and within one of said plurality of openings between said intermediate surface and said vaporizing unit, but spaced-apart from said vaporizing unit.

* * * * *